BINGHAM & PIERCE.
Corn-Planter.

No. 23,895.  Patented May 10, 1859.

UNITED STATES PATENT OFFICE.

L. F. BINGHAM AND N. O. PIERCE, OF CHICAGO, ILLINOIS.

IMPROVEMENT IN CORN-PLANTERS.

Specification forming part of Letters Patent No. 23,895, dated May 10, 1859.

*To all whom it may concern:*

Be it known that we, L. F. BINGHAM and N. O. PIERCE, of Chicago, Illinois, have invented a new and Improved Planter for Planting Corn, Sugar-Cane, Sorghum, and all seeds required to be be planted in hills, known as "Bingham & Pierce's American Rotary Automatic Corn-Planter;" and we do hereby declare that the following is a full, clear, and exact description of the construction and operation of the same, reference being had to the annexed drawings, making part of this specification, in which—

Figure 1:
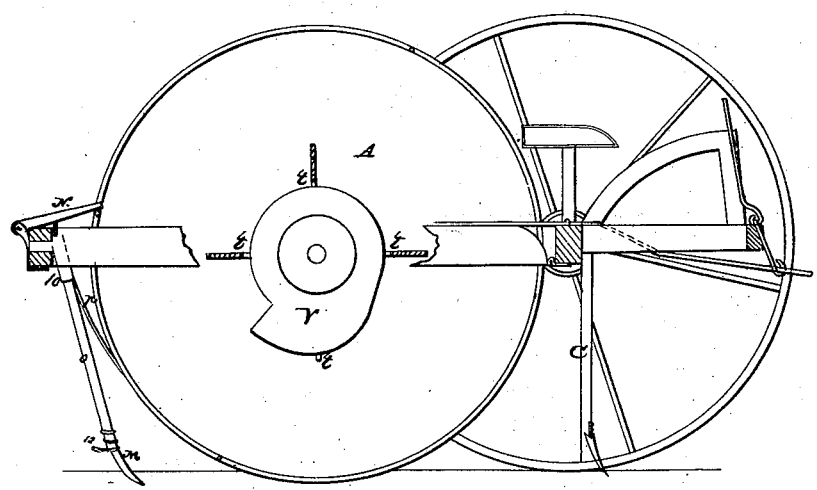
Figure 2:
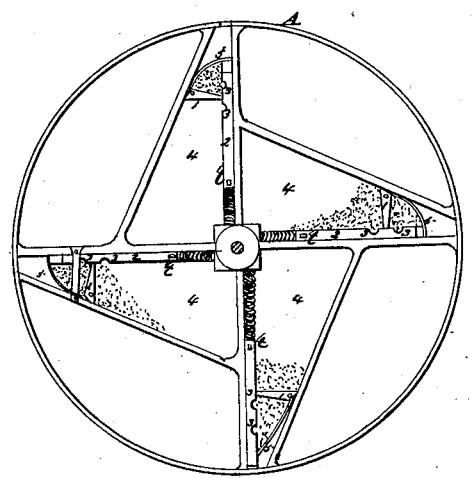

Figure 1 is a horizontal vertical section taken through the center of the machine; and Fig. 2 is a sectional view, showing the interior mechanism of the rotating planter.

We construct a planter by placing two revolving wheels on an axle of any desired dimensions, on the front of which we place plows or markers at equal and desired distances apart (seen at C, Fig. 1) in such a manner that they may be hoisted or lowered at pleasure. To the rear of the axle we so attach rotary planters (seen at A, Fig. 1, and A, Fig. 2) that they follow in the track of the plows or markers. We so inclose the rotary planters that they have separate and independent apartments, (seen at 4 4 4 4, Fig. 2,) with openings through the periphery or rim, (seen at E, Fig. 2.) In each apartment we place a dropper, (seen at 2 2 2 2, Fig. 2,) in the lower end of which is a cavity (seen at 3 3, Fig. 2) made to receive a less or greater quantity of seed, as may be desired. One end of the dropper is attached, near the center of the rotary planter, to a spiral spring, and the other end passes by the cut-off brush or flange (seen at 1 1, Fig. 2) to the opening of the apartment, with the cavity side next to and toward the cut-off brush or flange. In the apartment, and between the cut-off brush or flange and the outlet, we place a spring, (seen at 5, Fig. 2,) which keeps the outlet closed above or inside the opening of the apartment, except when opened by the downward movement of the dropper. On the inner or upper end of and at right angles with the dropper we place a nib or pin, (seen at *t t*, Fig. 2,) which projects out through the incasing of the apartment, (seen at *t t t*, Fig. 1.) On the outside of the rotary planter we place a stationary cam, (seen at V, Fig. 1,) connecting with the nib or pin *l*, and which, as the rotary planter revolves, acts on and gives motion to the dropper, carrying seed past the cut-off brush or flange, and at the same time depositing seed outside of the opening of the apartment, thus depositing between the cut-off brush or flange and the spring the seed in advance for the following hill.

Directly behind the rotary planter we place an upright or perpendicular square tube, (seen at 10, Fig. 1,) through which passes a jumper-beam, (seen at O, Fig. 1,) to the lower end of which we attach a scraper or hoe (seen at M, Fig. 1) and a "spat-down," (seen at 12, Fig. 1,) the former to cover the seed, the latter to pat down or level the hills.

To the upper end of the jumper-beam we attach a lever, (seen at N, Fig. 1,) which acts on cogs or pins placed on the rotary planter in such a manner as to jump and spat down the hills as the rotary planter revolves. Over the center of the axle, and on each side of the operator's seat, we place upright locks, upon which the crank-levers are thrown. When it is desired to raise one or more of the rotary planters we attach a rotary-planter scraper to the frame or tube of the jumper, (seen at *p*, Figs. 1 and 2,) whose office is to keep the rotary planter clear of dirt and other substances. We place the seed into the separate and independent apartments of the rotary planters through spaces made in the casing of the same for that purpose.

What we claim, and desire to secure by Letters Patent, is—

The arrangement of the rotating planter A, square tube 10, beam O, lever N, spat-down or leveler 12, and scraper *p*, as described, for the purposes set forth.

L. F. BINGHAM.
N. O. PIERCE.

Witnesses:
HUDSON WARREN,
J. R. HIGGINS.